US008571785B2

(12) United States Patent
Rajagopalan et al.

(10) Patent No.: US 8,571,785 B2
(45) Date of Patent: Oct. 29, 2013

(54) UNIVERSAL TRACKING AIR-FUEL REGULATOR FOR INTERNAL COMBUSTION ENGINES

(75) Inventors: Sai S. V. Rajagopalan, Sterling Heights, MI (US); Kenneth P. Dudek, Rochester Hills, MI (US); Sharon Liu, Ann Arbor, MI (US); Stephen Yurkovich, Columbus, OH (US); Shawn W. Midlam-Mohler, Columbus, OH (US); Yann G. Guezennec, Upper Arlington, OH (US); Yiran Hu, Powell, MI (US)

(73) Assignee: GM Global Technology Operations LLC

( * ) Notice: Subject to any disclaimer, the term of this patent is extended or adjusted under 35 U.S.C. 154(b) by 771 days.

(21) Appl. No.: 12/262,276

(22) Filed: Oct. 31, 2008

(65) Prior Publication Data

US 2009/0266052 A1 Oct. 29, 2009

Related U.S. Application Data

(60) Provisional application No. 61/047,165, filed on Apr. 23, 2008.

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F01N 3/00*** | (2006.01) |
| ***F02D 41/00*** | (2006.01) |

(52) U.S. Cl.
USPC .............................. 701/108; 60/276; 123/672

(58) Field of Classification Search
USPC ......... 123/672, 693, 694, 695, 696, 472, 480; 701/103, 104, 109; 60/276
See application file for complete search history.

(56) References Cited

U.S. PATENT DOCUMENTS

| | | | | |
|---|---|---|---|---|
| 4,386,592 | A * | 6/1983 | Ohgami et al. | 123/694 |
| 5,720,265 | A * | 2/1998 | Maki et al. | 123/680 |
| 7,143,755 | B2 * | 12/2006 | Miyauchi et al. | 123/674 |
| 7,212,915 | B2 | 5/2007 | Dudek | |
| 2004/0261402 | A1 * | 12/2004 | Sealy et al. | 60/285 |
| 2006/0081231 | A1 * | 4/2006 | White | 123/696 |

* cited by examiner

*Primary Examiner* — Stephen K Cronin
*Assistant Examiner* — Sizo Vilakazi

(57) ABSTRACT

A fuel control system of an engine system comprises a pre-catalyst exhaust gas oxygen (EGO) sensor, a setpoint generator module, a sensor offset module, and a control module. The pre-catalyst EGO sensor generates a pre-catalyst EGO signal based on an air-fuel ratio of an exhaust gas. The setpoint generator module generates a desired pre-catalyst equivalence ratio (EQR) signal based on a desired EQR of the exhaust gas. The sensor offset module determines an offset value of the pre-catalyst EGO sensor. The control module generates an expected pre-catalyst EGO signal based on the desired pre-catalyst EQR signal and the offset value.

20 Claims, 9 Drawing Sheets

UNIVERSAL TRACKING AIR-FUEL REGULATOR FOR INTERNAL COMBUSTION ENGINES

CROSS-REFERENCE TO RELATED APPLICATIONS

This application claims the benefit of U.S. Provisional Application No. 61/047,165, filed on Apr. 23, 2008.The disclosure of the above application is incorporated herein by reference.

FIELD

The present disclosure relates to engine control systems, and more particularly to fuel control systems for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel control system reduces emissions of a gasoline engine. The fuel control system controls an amount of fuel delivered to the engine based on data sensed by one or more exhaust gas oxygen (EGO) sensors disposed in an exhaust system of a vehicle. The EGO sensors are of two types: universal (wide-range) EGO sensors and switching-type EGO sensors. Typically, the term EGO sensor refers to a switching-type EGO sensor. As used herein, EGO sensors include wide-range EGO sensors and switching-type EGO sensors unless specified otherwise.

The fuel control system may include an inner feedback loop and an outer feedback loop. The inner feedback loop may use data from an EGO sensor arranged before a catalytic converter (i.e., a pre-catalyst EGO sensor) to control the amount of fuel delivered to the engine. For example, when the pre-catalyst EGO sensor senses a rich air/fuel ratio in an exhaust gas (i.e., low net oxygen), the inner feedback loop may decrease a desired amount of fuel sent to the engine (i.e., decrease a fuel command). When, however, the pre-catalyst EGO sensor senses a lean air/fuel ratio in the exhaust gas (i.e., excess net oxygen), the inner feedback loop may increase the fuel command. This maintains the air/fuel ratio near true stoichiometry, thereby improving the performance of the fuel control system. Improving the performance of the fuel control system may improve fuel economy of the vehicle.

The inner feedback loop may use a proportional-integral control scheme to correct the fuel command. The fuel command may be further corrected based on a short term fuel trim or a long term fuel trim. The short term fuel trim may correct the fuel command by changing gains of the proportional-integral control scheme based on engine operating conditions. The long term fuel trim may correct the fuel command when the short term fuel trim is unable to fully correct the fuel command within a desired time period.

The outer feedback loop may use information from an EGO sensor arranged after the converter (i.e., a post-catalyst EGO sensor) to correct the EGO sensors and/or the oxygen storage state of the converter when there is an unexpected reading. For example, the outer feedback loop may use the information from the post-catalyst EGO sensor to maintain the post-catalyst EGO sensor at a required voltage level. As such, the converter maintains a desired amount of oxygen stored, thereby improving the performance of the fuel control system. The outer feedback loop may control the inner feedback loop by changing thresholds used by the inner feedback loop to determine whether the air/fuel ratio is rich or lean.

Exhaust gas composition affects the behavior of the EGO sensors, thereby affecting accuracy of the EGO sensor values. For example, an EGO sensor may indicate that an exhaust gas includes a rich air/fuel ratio when the exhaust gas actually does not include the rich air/fuel ratio. As a result, fuel control systems have been designed to operate based on values that are different than those reported. For example, fuel control systems have been designed to operate "asymmetrically," where the threshold used to indicate the lean air/fuel ratio is different than the threshold used to indicate the rich air/fuel ratio.

Since the asymmetry is a function of the exhaust gas composition, and the exhaust gas composition is a function of the engine operating conditions, the asymmetry is typically designed as a function of the engine operating conditions. The asymmetry is achieved indirectly by adjusting the gains and the thresholds of the inner feedback loop, which requires numerous tests at each of the engine operating conditions. Moreover, this extensive calibration is required for each powertrain and vehicle class and does not easily accommodate other technologies, including, but not limited to, variable valve timing and lift.

SUMMARY

A fuel control system of an engine system comprises a pre-catalyst exhaust gas oxygen (EGO) sensor, a setpoint generator module, a sensor offset module, and a control module. The pre-catalyst EGO sensor generates a pre-catalyst EGO signal based on an air-fuel ratio of an exhaust gas. The setpoint generator module generates a desired pre-catalyst equivalence ratio (EQR) signal based on a desired EQR of the exhaust gas. The sensor offset module determines an offset value of the pre-catalyst EGO sensor. The control module generates an expected pre-catalyst EGO signal based on the desired pre-catalyst EQR signal and the offset value.

A method for controlling fuel supply to an engine comprises generating a pre-catalyst EGO signal based on an air-fuel ratio of an exhaust gas, generating a desired pre-catalyst EQR signal, determining an offset value of the pre-catalyst EGO sensor, and generating an expected pre-catalyst EGO signal based on the desired pre-catalyst EQR signal and the offset value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
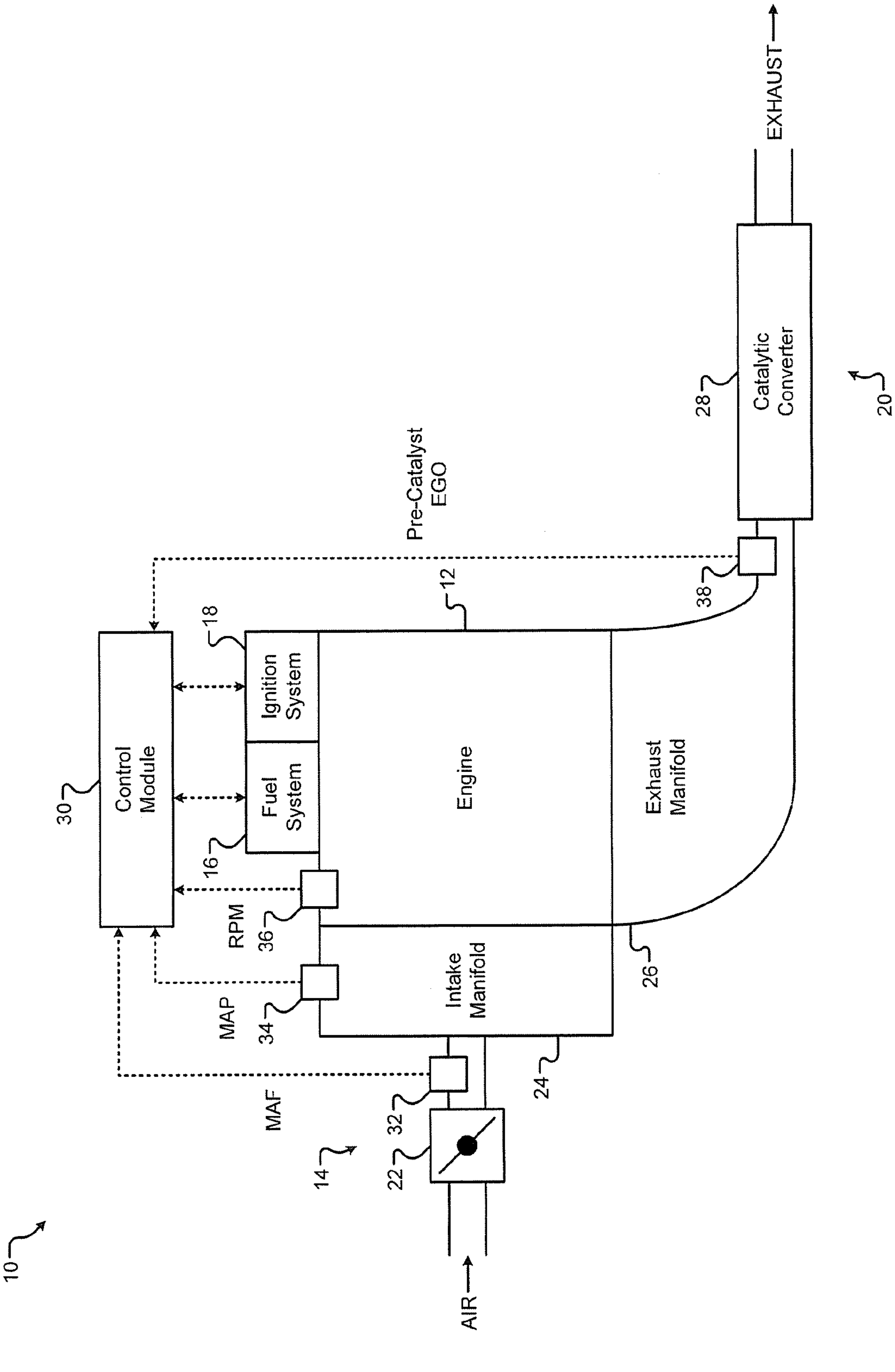
FIG. 1 is a functional block diagram of an exemplary implementation of an engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To reduce calibration costs associated with conventional fuel control systems, the fuel control system of the present disclosure allows for direct achievement of desired behavior, including asymmetric behavior. In other words, the fuel control system achieves the desired behavior through open loop control instead of closed loop control. Open loop control may include using a model that relates the desired behavior to a fuel command or a dither signal needed to achieve the desired behavior instead of a calibration of closed loop control gains.

Specifically, the fuel control system achieves the desired behavior of an oscillating equivalence ratio (EQR) of an exhaust gas through open loop control. Such oscillations improve the performance of the fuel control system. For example, the oscillations prevent a low or a high oxygen storage level in a catalytic converter of the engine system. The fuel control system achieves the desired EQR by determining an expected EQR of the exhaust gas based on a model that relates the expected level to the desired level. The fuel control system compensates a current fuel command to meet the expected EQR even amidst system disturbances and/or modeling errors. The fuel control system accommodates different powertrains (e.g., powertrains with heated oxygen sensors and/or wide-range sensors) and vehicle classes.

Referring now to FIG. 1, an exemplary engine system 10 is shown. The engine system 10 includes an engine 12, an intake system 14, a fuel system 16, an ignition system 18, and an exhaust system 20. The engine 12 may be any type of internal combustion engine with fuel injection. For example only, the engine 12 may include a fuel injected engine, a gasoline direct injection engine, a homogeneous charge compression ignition engine, or another type of engine.

The intake system 14 includes a throttle 22 and an intake manifold 24. The throttle 22 controls air flow into the engine 12. The fuel system 16 controls fuel flow into the engine 12. The ignition system 18 ignites an air/fuel mixture provided to the engine 12 by the intake system 14 and the fuel system 16.

An exhaust gas created by combustion of the air/fuel mixture exits the engine 12 through the exhaust system 20. The exhaust system 20 includes an exhaust manifold 26 and a catalytic converter 28. The catalytic converter 28 receives the exhaust gas from the exhaust manifold 26 and reduces toxicity of the exhaust gas before it leaves the engine system 10.

The engine system 10 further includes a control module 30 that controls the operation of the engine 12 based on various engine operating parameters. The control module 30 is in communication with the fuel system 16 and the ignition system 18. The control module 30 is further in communication with a mass air flow (MAF) sensor 32, a manifold air pressure (MAP) sensor 34, and an engine revolutions per minute (RPM) sensor 36. The control module 30 is further in communication with an exhaust gas oxygen (EGO) sensor arranged in the exhaust manifold 26 (i.e., a pre-catalyst EGO sensor 38).

The MAF sensor 32 generates a MAF signal based on a mass of air flowing into the intake manifold 24. The MAP sensor 34 generates a MAP signal based on an air pressure in the intake manifold 24. The RPM sensor 36 generates a RPM signal based on a rotational velocity of a crankshaft (not shown) of the engine 12.

The pre-catalyst EGO sensor 38 generates a pre-catalyst EGO signal based on an air-fuel ratio of the exhaust gas in the exhaust manifold 26. For example only, the pre-catalyst EGO sensor 38 may include, but is not limited to, a switching EGO sensor or a universal EGO (UEGO) sensor. The switching EGO sensor generates an EGO signal in units of voltage and switches the EGO signal to a low or a high voltage when the air-fuel ratio is nominally lean or nominally rich, respectively. The UEGO sensor generates an EGO signal in units of equivalence ratio (EQR) and eliminates the switching between nominally lean and rich air-fuel ratios of the switching EGO sensor.

Figure 2:
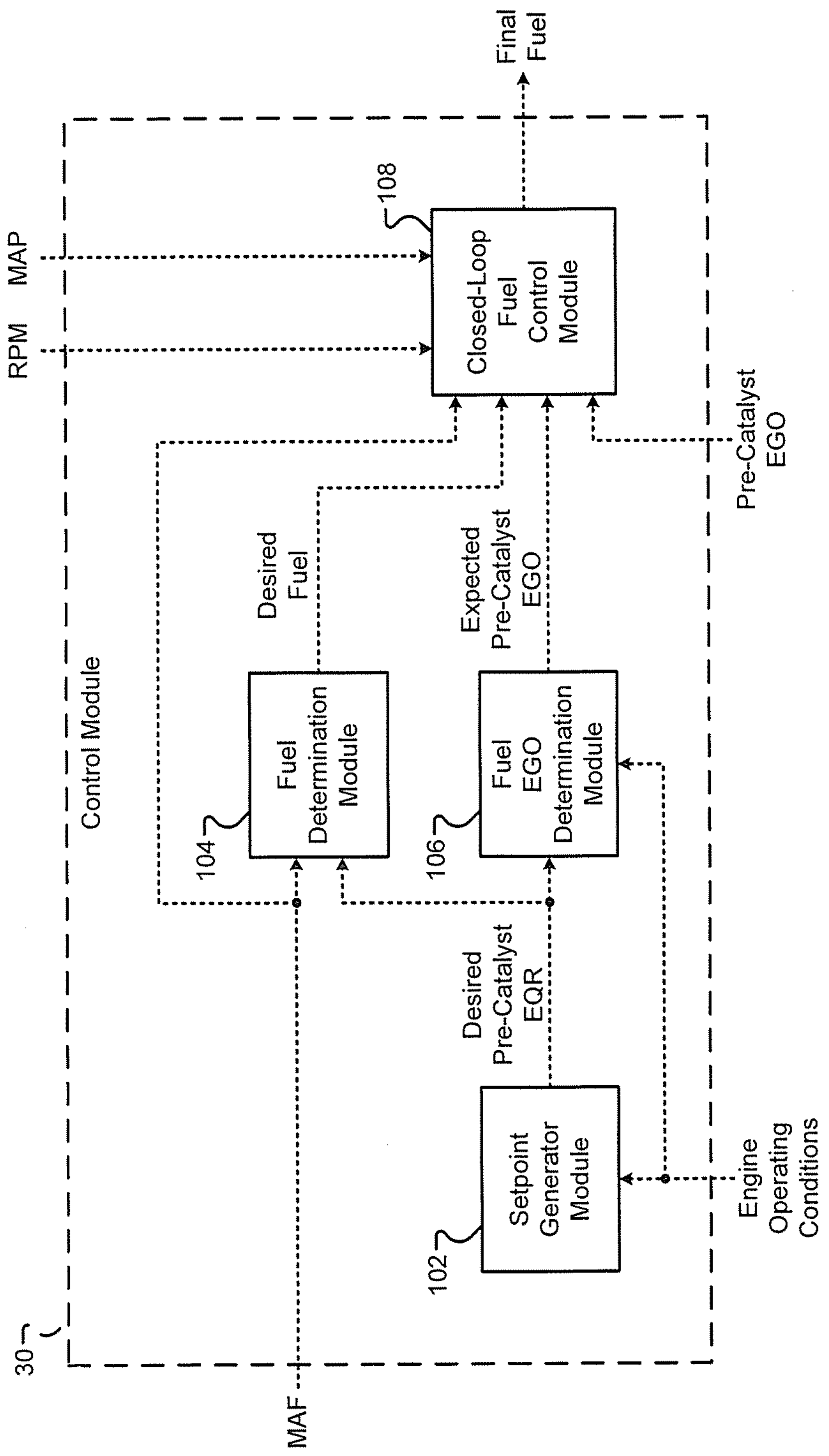
FIG. 2 is a functional block diagram of an exemplary implementation of a control module according to the present disclosure.

Referring now to FIG. 2, the control module 30 includes a setpoint generator module 102, a fuel determination module 104, a fuel EGO determination module 106, and a closed-loop fuel control module 108. The setpoint generator module 102 generates a desired pre-catalyst EQR signal based on a dither signal and a desired EQR of the exhaust gas in the exhaust manifold 26 in units of EQR. The desired pre-catalyst EQR signal oscillates about the desired EQR.

The fuel determination module 104 receives the desired pre-catalyst EQR signal and the MAF signal. The fuel determination module 104 determines a desired fuel command based on the desired pre-catalyst EQR signal and the MAF signal. More specifically, the fuel determination module 104 multiplies the desired pre-catalyst EQR signal by the MAF signal.

The fuel determination module 104 further multiplies the product of the desired pre-catalyst EQR signal and the MAF signal by a predetermined air-fuel ratio at stoichiometry to determine the desired fuel command. For example only, the air-fuel ratio at stoichiometry may be 1:14.7. The desired fuel command oscillates due to the oscillations (due to dithering) of the desired pre-catalyst EQR signal.

The fuel EGO determination module 106 receives the desired pre-catalyst EQR signal and generates an expected pre-catalyst EGO signal based on the desired pre-catalyst EQR signal. The expected pre-catalyst EGO signal includes an expected air-fuel ratio of the exhaust gas in the exhaust manifold 26 in response to the desired fuel command in units of voltage or EQR. The closed-loop fuel control module 108 receives the MAF signal, the desired fuel command, the expected pre-catalyst EGO signal, the pre-catalyst EGO signal, the RPM signal, and the MAP signal.

The closed-loop fuel control module 108 determines a fuel correction factor based on the MAF signal, expected pre-catalyst EGO signal, the pre-catalyst EGO signal, the RPM signal, and the MAP signal. The fuel correction factor minimizes an error between the expected pre-catalyst EGO signal and the pre-catalyst EGO signal. The closed-loop control module 108 adds the fuel correction factor to the desired fuel command to determine a new command for the fuel system 16 (i.e., a final fuel command).

Figure 3:
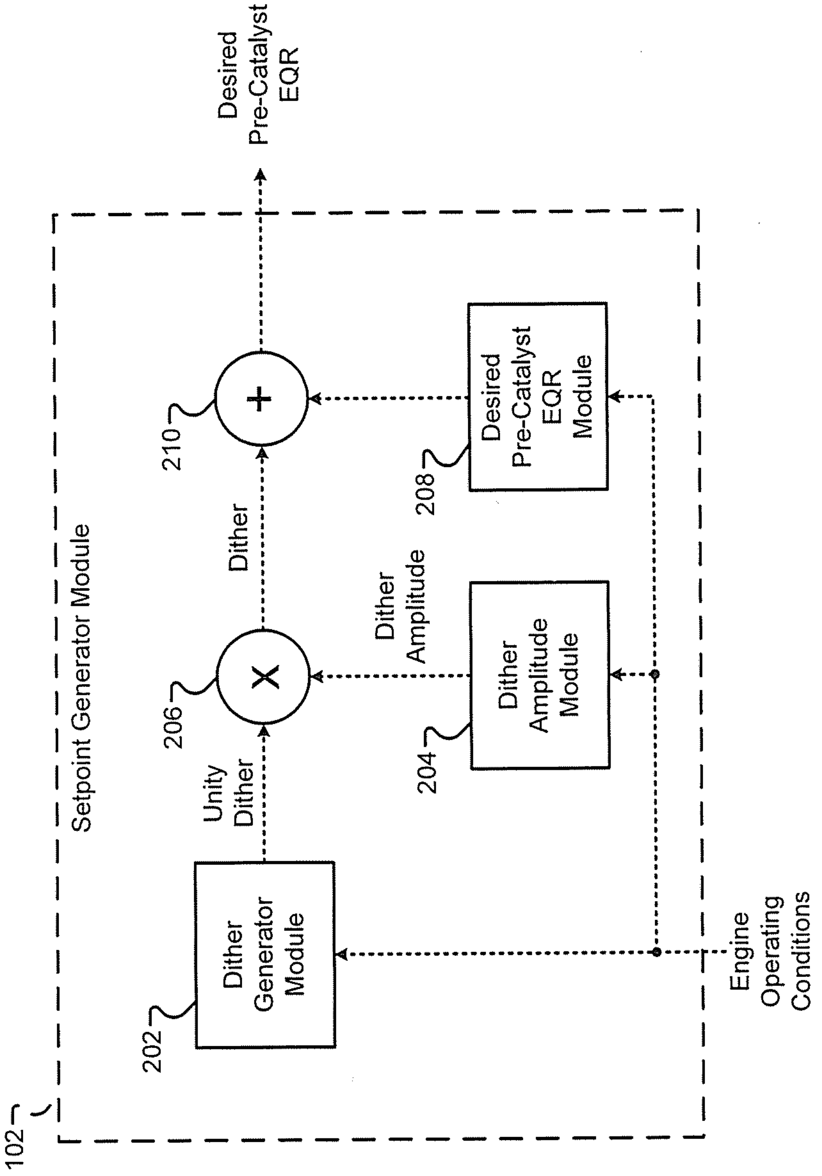
FIG. 3 is a functional block diagram of an exemplary implementation of a setpoint generator module according to the present disclosure.

Referring now to FIG. 3, the setpoint generator module 102 is shown. The setpoint generator module 102 includes a dither generator module 202, a dither amplitude module 204, a multiplication module 206, a desired pre-catalyst EQR module 208, and a summation module 210. The dither generator module 202 is an open loop command generator that generates a unity dither signal (i.e., a dither signal with an amplitude of 1 in value) based on engine operating conditions. For example only, the engine operating conditions may include, but are not limited to, the rotational velocity of the crankshaft, the air pressure in the intake manifold 24, and/or a temperature of engine coolant. The control module 30 uses the unity dither signal to command oscillation of the desired EQR of the exhaust gas in the exhaust manifold 26.

The dither amplitude module 204 is an open loop command generator that generates a dither amplitude (i.e., a maximum amplitude for the unity dither signal) based on the engine operating conditions. The multiplication module 206 receives the unity dither signal and the dither amplitude. The multiplication module 206 multiplies the unity dither signal by the dither amplitude to determine the dither signal.

The desired pre-catalyst EQR module 208 is an open loop command generator. The desired pre-catalyst EQR module 208 generates the desired pre-catalyst EQR signal based on the desired EQR of the exhaust gas in the exhaust manifold 26. The desired pre-catalyst EQR module 208 determines the desired EQR based on the engine operating conditions.

The summation module 210 receives the dither signal and the desired pre-catalyst EQR signal. The summation module 210 sums the dither signal and the desired pre-catalyst EQR signal. In other words, the summation module 210 applies the dither signal to the desired pre-catalyst EQR signal. The dither signal causes the desired pre-catalyst EQR signal to oscillate about the desired EQR.

Figure 4:
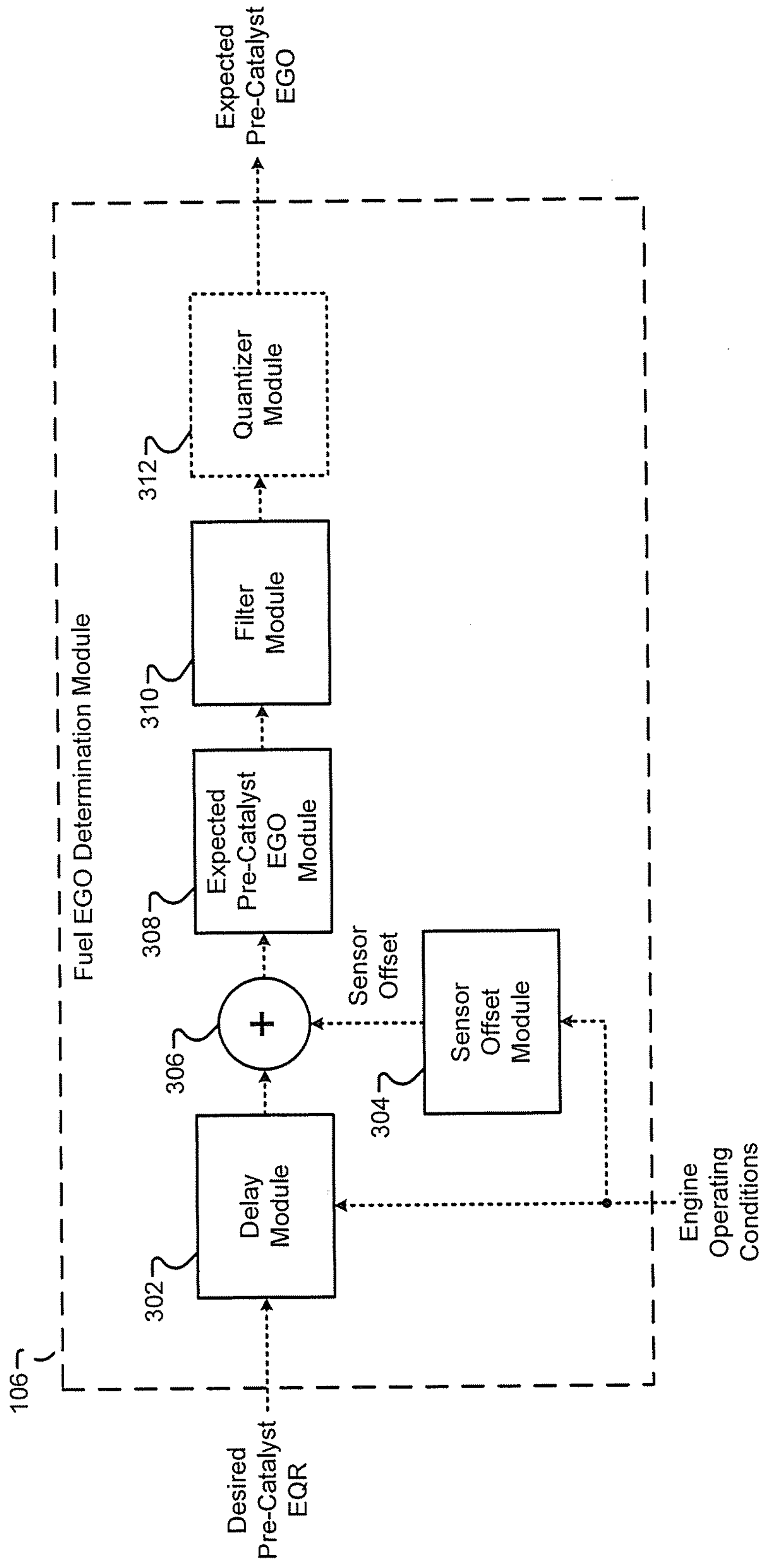
FIG. 4 is a functional block diagram of an exemplary implementation of a fuel exhaust gas oxygen (EGO) determination module according to the present disclosure.

Referring now to FIG. 4, the fuel EGO determination module 106 is shown. The fuel EGO determination module 106 includes a delay module 302, a sensor offset module 304, a summation module 306, an expected pre-catalyst EGO module 308, and a filter module 310. The fuel EGO determination module 106 includes a quantizer module 312 if the pre-catalyst EGO sensor 38 includes a switching EGO sensor.

The delay module 302 receives the desired pre-catalyst EQR signal and determines a number of events to delay the desired pre-catalyst EQR signal based on the engine operating conditions. For example only, an event may include, but is not limited to, each time the engine 12 ignites the air/fuel mixture. For example only, the number of events to delay the desired pre-catalyst EQR signal may be determined to be a number of events from when the control module 30 outputs the final fuel command to when the pre-catalyst EGO sensor 38 generates the pre-catalyst EGO signal. The delay module 302 delays the desired pre-catalyst EQR signal for the determined number of events.

The sensor offset module 304 is an open loop command generator and generates a sensor offset based on the engine operating conditions. The sensor offset is a change in value of the desired pre-catalyst EQR signal that accounts for a change in value of the expected pre-catalyst EGO signal due to exhaust gas composition affecting the pre-catalyst EGO sensor. The summation module 306 receives the desired pre-catalyst EQR signal and the sensor offset and sums the desired pre-catalyst EQR signal and the sensor offset.

The expected pre-catalyst EGO module 308 receives the sum of the desired pre-catalyst EQR signal and the sensor offset and determines the expected pre-catalyst EGO signal based on the sum. The expected pre-catalyst EGO module 308 determines the expected pre-catalyst EGO signal based on a model that relates the expected pre-catalyst EGO signal to the sum of the desired pre-catalyst EQR signal and the sensor offset. For example only, the model may include, but is not limited to, a model for a switching EGO sensor, as described in FIG. 5A, or a model for an UEGO sensor, as described in FIG. 5B.

The filter module 310 receives the expected pre-catalyst EGO signal and filters the expected pre-catalyst EGO signal for use by the closed-loop fuel control module 108. For example only, the filter module 310 may include, but is not limited to, a first-order lag filter that reduces the noise of the expected pre-catalyst EGO signal. When the pre-catalyst EGO sensor 38 includes a switching EGO sensor, the first-order lag filter causes the expected pre-catalyst EGO signal to lag and to better indicate switching.

If the pre-catalyst EGO sensor 38 includes a switching EGO sensor, the quantizer module 312 receives the expected pre-catalyst EGO signal. The quantizer module 312 quantizes (i.e., converts into a discrete and/or digital signal) the expected pre-catalyst EGO signal for use by the closed-loop fuel control module 108. The quantizer module 312 includes limits on values of the quantized expected pre-catalyst EGO signal that are smaller in range than the limits of the switching EGO sensor on values of the pre-catalyst EGO signal. For example only, the quantizer module 312 may include limits of 0.25 volts and 0.65 volts, while the switching EGO sensor includes a nominal switch point of 0.45 volts and limits of 0.05 volts and 0.90 volts. The limits of the quantizer module 312 improves the performance of the fuel control system because the limits of the switching EGO sensor change with age, making sensor switching more difficult to detect.

Figure 5A:
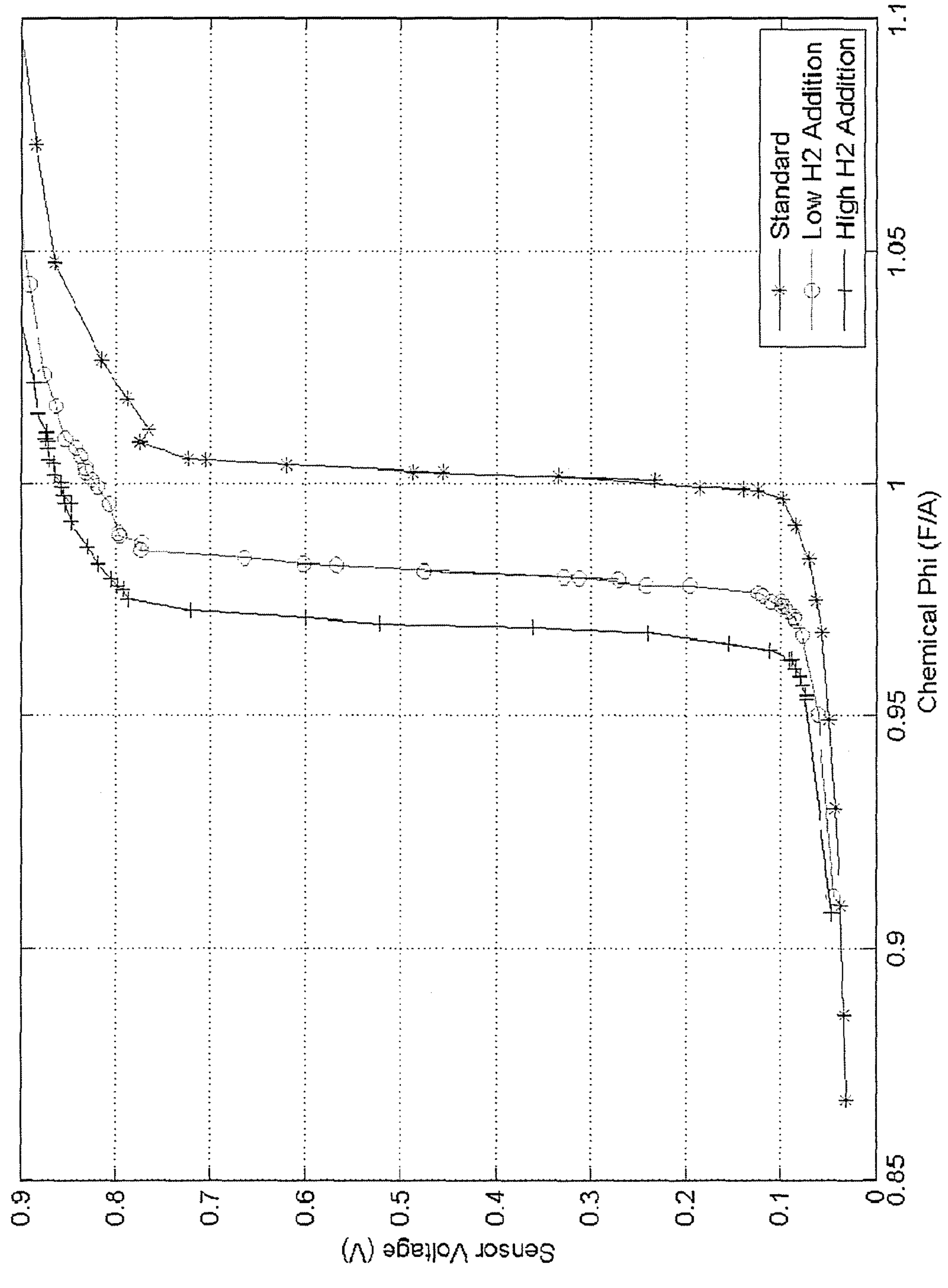
FIG. 5A is an exemplary graph of expected pre-catalyst EGO signals to be generated by a switching EGO sensor as a function of a desired equivalence ratio (EQR) of exhaust gas in an exhaust manifold according to the present disclosure.

Referring now to FIG. 5A, an exemplary graph shows expected pre-catalyst EGO signals to be generated by a switching EGO sensor (i.e., Sensor Voltage) as a function of a desired EQR of the exhaust gas in the exhaust manifold 26 (i.e., Chemical Phi). The graph may be used as the model that relates the expected pre-catalyst EGO signal to the sum of the desired pre-catalyst EQR signal and the sensor offset, as described in FIG. 4. When the desired EQR is lean, the expected pre-catalyst EGO signals are at low voltages. When the desired EQR is rich, the expected pre-catalyst EGO signals are at higher voltages.

The graph shows how the expected pre-catalyst EGO signal changes in value due to exhaust gas composition affecting the switching EGO sensor. In particular, the graph shows how the expected pre-catalyst EGO signal changes in value when a low amount and a high amount of hydrogen (i.e., H2) are added to the exhaust gas composition. Accordingly, when the expected pre-catalyst EGO signal changes in value due to changes in the exhaust gas composition, the desired EQR is changed via the sensor offset.

Figure 5B:
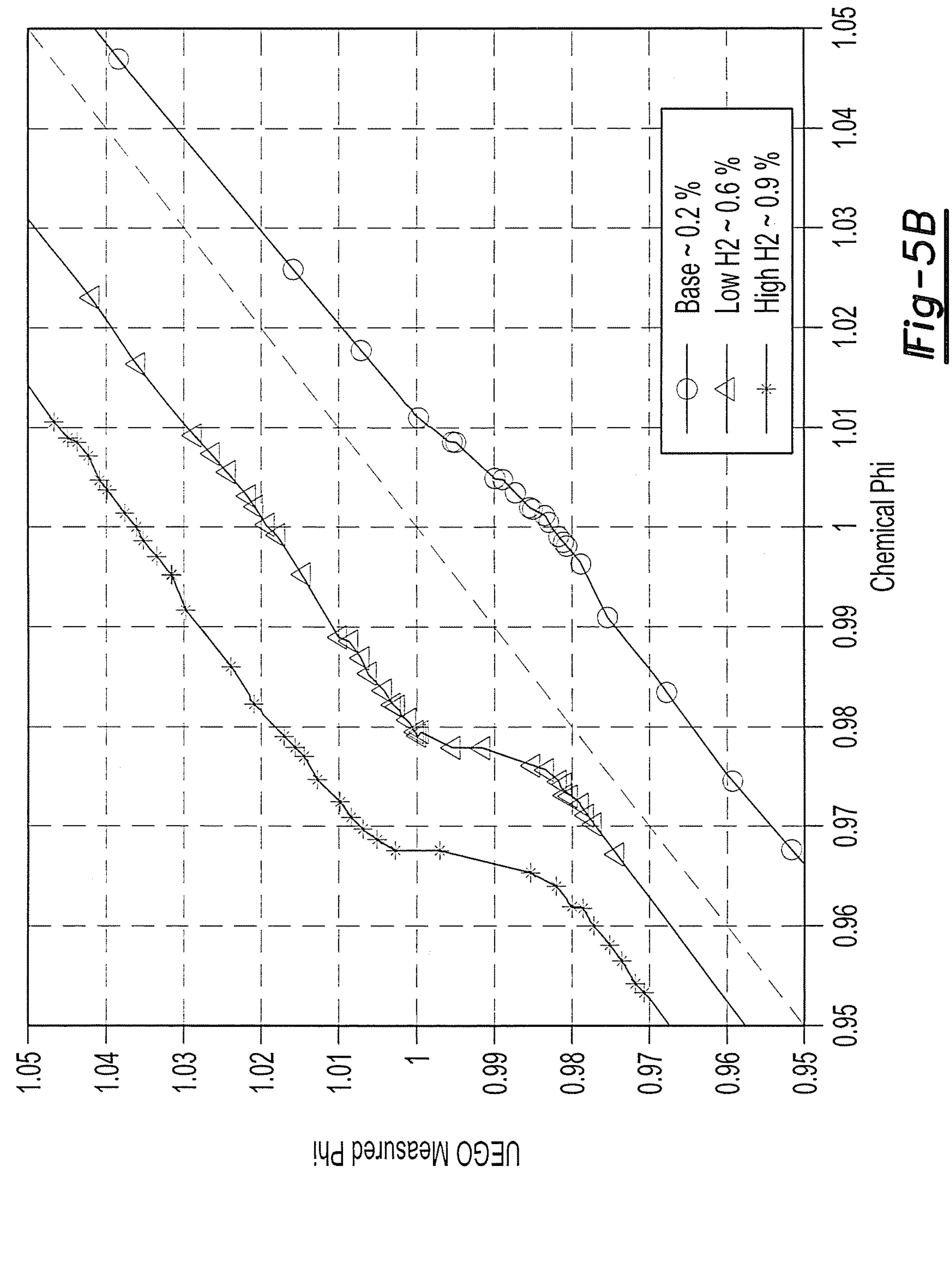
FIG. 5B is an exemplary graph of expected pre-catalyst EGO signals to be generated by a universal EGO (UEGO) sensor as a function of a desired EQR of exhaust gas in the exhaust manifold according to the present disclosure.

Referring now to FIG. 5B, an exemplary graph shows expected pre-catalyst EGO signals to be generated by a UEGO sensor (i.e., UEGO Measured Phi) as a function of a desired EQR of exhaust gas in the exhaust manifold 26 (i.e., Chemical Phi). The graph may be used as the model that relates the expected pre-catalyst EGO signal to the sum of the desired pre-catalyst EQR signal and the sensor offset, as described in FIG. 4. The graph shows how the expected pre-catalyst EGO signal changes in value due to exhaust gas composition affecting the UEGO sensor. In particular, the graph shows how the expected pre-catalyst EGO signal changes in value when a low amount and a high amount of hydrogen are added to the exhaust gas composition. Accordingly, when the expected pre-catalyst EGO signal changes in value due to changes in the exhaust gas composition, the EQR is changed via the sensor offset.

Figure 6:
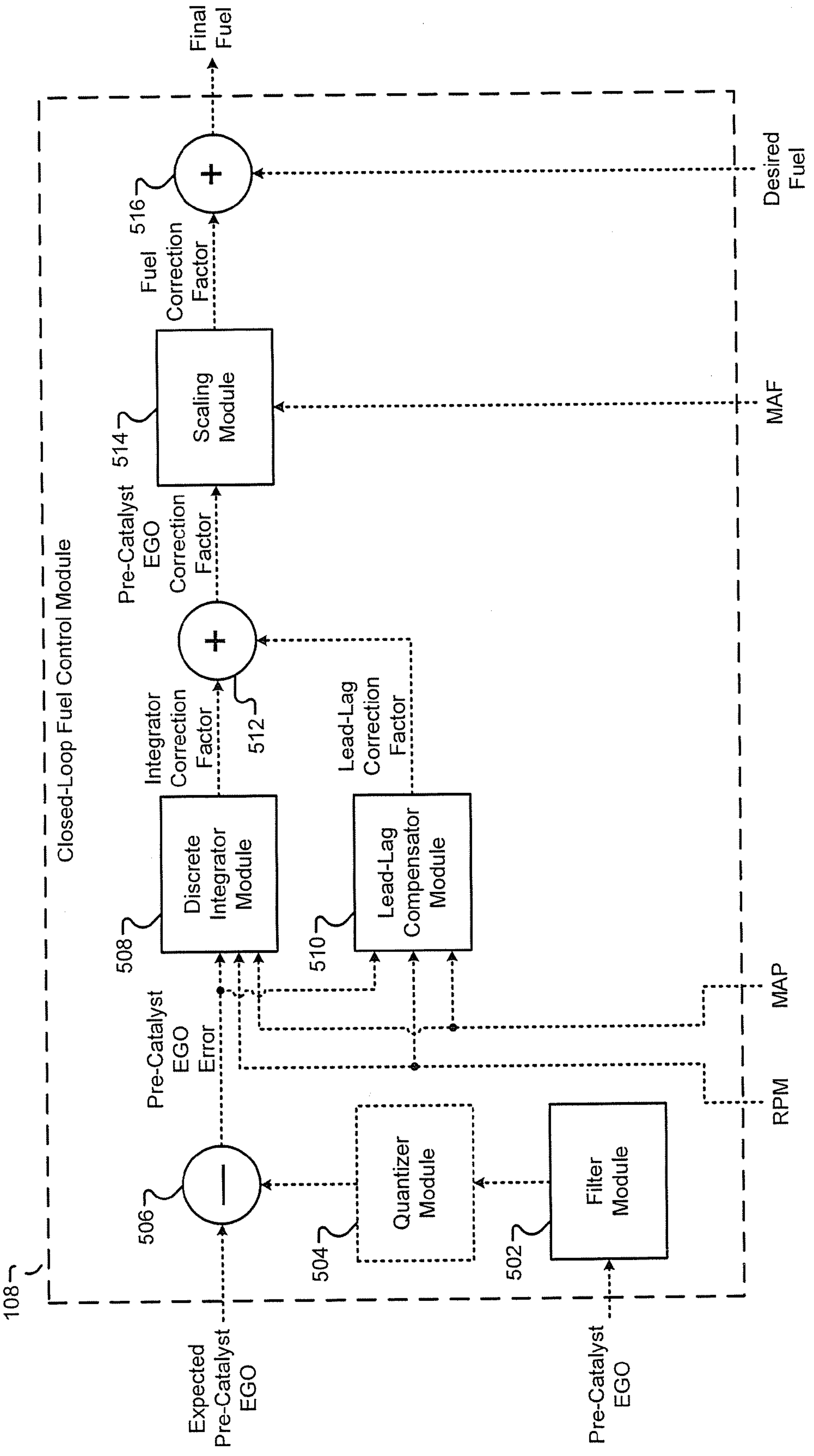
FIG. 6 is a functional block diagram of an exemplary implementation of a closed-loop fuel control module according to the present disclosure.

Referring now to FIG. 6, the closed-loop fuel control module 108 is shown. The closed-loop fuel control module 108 includes a filter module 502, a subtraction module 506, a discrete integrator module 508, a lead-lag compensator module 510, and a summation module 512. The closed-loop control module 108 further includes a scaling module 514 and a summation module 516. The closed-loop fuel control module 108 includes a quantizer module 504 if the pre-catalyst EGO sensor 38 includes a switching EGO sensor.

The filter module 502 receives the pre-catalyst EGO signal and filters the pre-catalyst EGO signal for use by the closed-loop fuel control module 108. For example only, the filter module 502 may include, but is not limited to, a first-order lag filter that reduces the noise of the pre-catalyst EGO signal. When the pre-catalyst EGO sensor 38 includes a switching EGO sensor, the first-order lag filter causes the pre-catalyst EGO signal to lag and to better indicate switching. If the pre-catalyst EGO sensor 38 includes a switching EGO sensor, the quantizer module 504 receives the pre-catalyst EGO signal and quantizes the pre-catalyst EGO signal for use by the closed-loop fuel control module 108.

The subtraction module 506 receives the expected pre-catalyst EGO signal and the pre-catalyst EGO signal. The subtraction module 506 subtracts the pre-catalyst EGO signal from the expected pre-catalyst EGO signal to determine a pre-catalyst EGO error. The discrete integrator module 508 receives the pre-catalyst EGO error, the RPM signal, and the MAF signal.

The discrete integrator module 508 discretely integrates the pre-catalyst EGO error to determine an integrator correction factor. The discrete integrator module 508 uses a proportional-integral (PI) control scheme to determine the integrator correction factor. The integrator correction factor includes an offset based on a discrete integral of the difference between the expected pre-catalyst EGO signal and the pre-catalyst EGO signal.

The discrete integrator module 508 determines a gain of the integral correction factor based on the RPM signal and the MAF signal. A gain K is determined according to the following equation:

$$K = A_0 + \sum_{p=1}^{m} A_p(RPM - RPM_p) + \sum_{q=1}^{n} A_{m+q}(MAP - MAP_q), \tag{1}$$

where A are predetermined integral constants, RPM is the RPM signal, $RPM_p$ are predetermined knots of a spline of the RPM signal, m is a predetermined amount of the knots of the spline of the RPM signal, MAP is the MAP signal, $MAP_q$ are predetermined knots of a spline of the MAP signal, and n is a predetermined amount of the knots of the spline of the MAP signal. For example only, values of the knots of the spline of the RPM signal may include, but are not limited to, 500, 1300, 2100, 2900, 3700, and/or 4500 revolutions per minute. For example only, values of the knots of the spline of the MAP signal may include, but are not limited to, 15, 30, 45, 60, 75, and/or 90 kilopascals.

Further discussion of the knots of the splines of the RPM signal and the MAP signal may be found in commonly assigned U.S. Pat. No. 7,212,915, issued on May 1, 2007 and entitled "Application of Linear Spines to Internal Combustion Engine Control," the disclosure of which is incorporated herein by reference in its entirety. The integrator correction factor is in units of percent, which is equivalent to units of EQR. The integrator correction factor is used to correct small pre-catalyst EGO errors and to handle slow variations in the expected pre-catalyst EGO signal and the pre-catalyst EGO signal.

The lead-lag compensator module 510 receives the pre-catalyst EGO error, the RPM signal, and the MAF signal. The lead-lag compensator module 510 discretely integrates the pre-catalyst EGO error to determine a lead-lag correction factor. The lead-lag compensator module 510 uses a PI control scheme to determine the lead-lag correction factor. The lead-lag compensator module 510 includes an offset based on a discrete integral of the difference between the expected pre-catalyst EGO signal and the pre-catalyst EGO signal. A lead-lag correction factor $PI_{lead\text{-}lag}$ is determined according to the following equation:

$$PI_{lead\text{-}lag}(k) = \sum_{i=1}^{2} \Gamma_i \times PI_{lead\text{-}lag}(k-i) + \sum_{j=0}^{3} \Delta_j \times EGO_{error}(k-j), \tag{2}$$

where $\Gamma$ and $\Delta$ are gains of the lead-lag correction factor and $EGO_{error}$ is the pre-catalyst EGO error.

The lead-lag compensator module 510 determines the gains of the lead-lag correction factor based on the RPM signal and the MAF signal. The gain $\Gamma$ is determined according to the following equation:

$$\Gamma = B_0 + \sum_{p=1}^{m} A_p(RPM - RPM_p) + \sum_{q=1}^{n} B_{m+q}(MAP - MAP_q), \tag{3}$$

where B are predetermined integral constants. The gain $\Delta$ is determined according to the following equation:

$$\Delta = C_0 + \sum_{p=1}^{m} A_p(RPM - RPM_p) + \sum_{q=1}^{n} C_{m+q}(MAP - MAP_q), \tag{4}$$

where C are predetermined integral constants. The lead-lag correction factor is in units of percent, which is equivalent to units of EQR. The lead-lag correction factor is used to correct large pre-catalyst EGO errors and to handle fast variations in the expected pre-catalyst EGO signal and the pre-catalyst EGO signal.

The summation module 512 receives the integrator correction factor and the lead-lag correction factor and sums the correction factors to determine a pre-catalyst EGO correction factor. The scaling module 514 receives the pre-catalyst EGO correction factor and the MAF signal. The scaling module 514 determines the fuel correction factor based on the pre-catalyst EGO correction factor and the MAF signal.

More specifically, the scaling module 514 multiplies the pre-catalyst EGO correction factor by the MAF signal. The fuel determination module 104 further multiplies the product of the pre-catalyst EGO correction factor and the MAF signal by the air-fuel ratio at stoichiometry to determine the fuel correction factor. The summation module 516 receives the fuel correction factor and the desired fuel command and sums the fuel correction factor and the desired fuel command to determine the final fuel command.

Figure 7A:
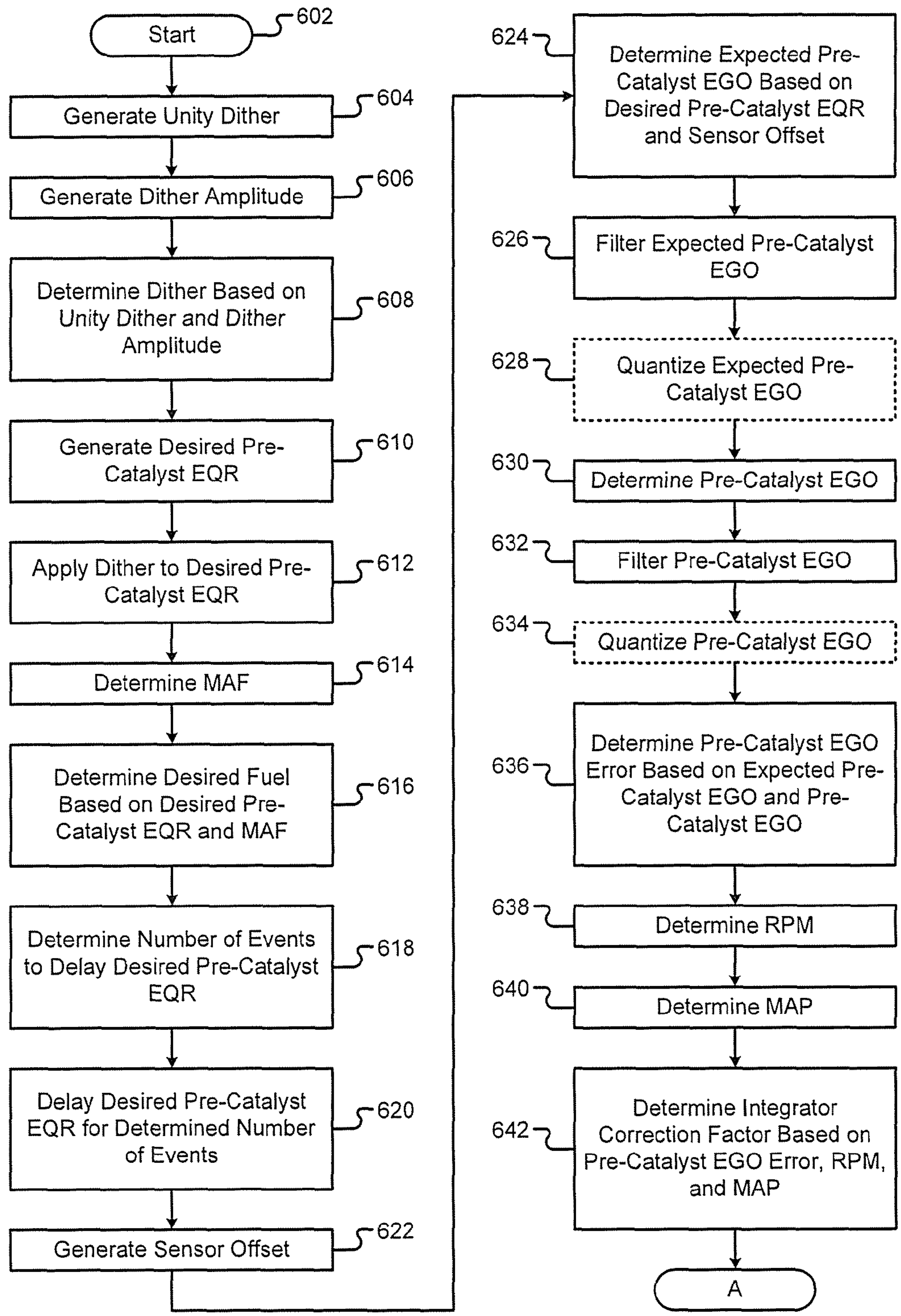
FIGS. 7A and 7B show a flowchart of exemplary steps performed by the control module of FIG. 2 according to the present disclosure.
Figure 7B:
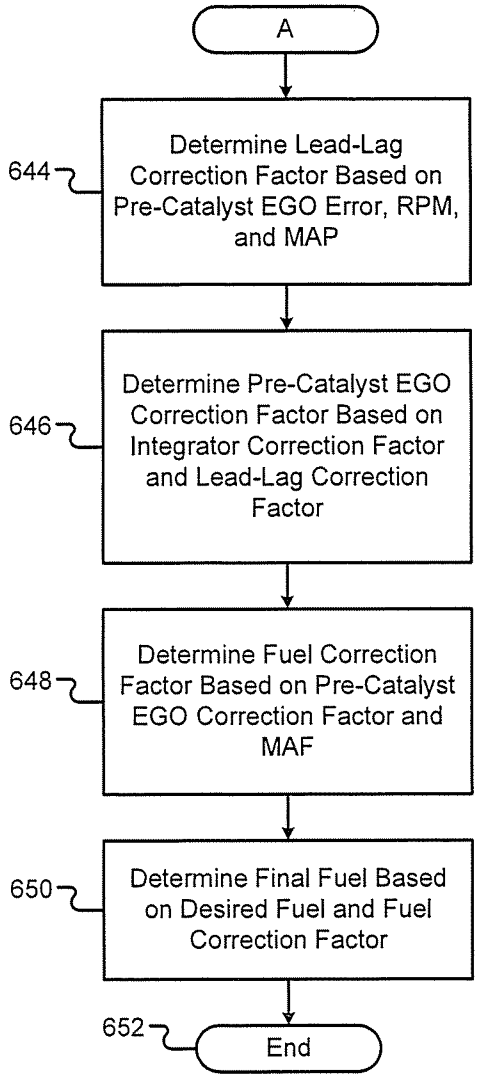

Referring now to FIGS. 7A and 7B, a flowchart of exemplary steps performed by the control module 30 is shown. Control begins in step 602. In step 604, the unity dither signal (i.e., Unity Dither) is generated. In step 606, the dither amplitude is generated.

In step 608, the dither signal (i.e., Dither) is determined based on the unity dither signal and the dither amplitude. In step 610, the desired pre-catalyst EQR signal (i.e., Desired Pre-Catalyst EQR) is generated. In step 612, the dither signal is applied to the desired pre-catalyst EQR signal.

In step 614, the MAF signal (i.e., MAF) is generated. In step 616, the desired fuel command (i.e., Desired Fuel) is determined based on the desired pre-catalyst EQR signal and the MAF signal. In step 618, the number of events to delay the desired pre-catalyst EQR signal is determined.

In step 620, the desired pre-catalyst EQR signal is delayed for the determined number of events. In step 622, the sensor offset is generated. In step 624, the expected pre-catalyst EGO signal (i.e., Expected Pre-Catalyst EGO) is generated based on the desired pre-catalyst EQR signal and the sensor offset.

In step 626, the expected pre-catalyst EGO signal is filtered. In step 628, the expected pre-catalyst EGO signal is quantized if the pre-catalyst EGO sensor 38 includes a switching EGO sensor. In step 630, the pre-catalyst EGO signal (i.e., Pre-Catalyst EGO) is determined.

In step 632, the pre-catalyst EGO signal is filtered. In step 634, the pre-catalyst EGO signal is quantized if the pre-catalyst EGO sensor 38 includes a switching EGO sensor. In step 636, the pre-catalyst EGO error is determined based on the expected pre-catalyst EGO signal and the pre-catalyst EGO signal.

In step 638, the RPM signal (i.e., RPM) is generated. In step 640, the MAP signal (i.e., MAP) is generated. In step 642, the integrator correction factor is determined based on the pre-catalyst EGO error, the RPM signal, and the MAP signal.

In step 644, the lead-lag correction factor is determined based on the pre-catalyst EGO error, the RPM signal, and the MAP signal. In step 646, the pre-catalyst EGO correction factor is determined based on the integrator correction factor and the lead-lag correction factor. In step 648, the fuel correction factor is determined based on the pre-catalyst EGO correction factor and the MAF signal. In step 650, the final fuel command (i.e., Final Fuel) is determined based on the desired fuel command and the fuel correction factor. Control ends in step 652.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A fuel control system of an engine, comprising:

a setpoint generator module that generates a desired equivalence ratio (EQR) signal based on a dither signal and a desired EQR of an exhaust gas;

an offset module that generates an offset indicating a change in the desired EQR signal; and a control module that generates an expected EQR signal based on a model that relates the expected EQR signal to a sum of the desired EQR signal and the offset and that adjusts a fuel command to meet the expected EQR signal, wherein the control module generates the expected EQR signal independently of a feedback from an exhaust gas oxygen (EGO) sensor.

2. The fuel control system of claim 1 further comprising a delay module that determines a number of engine events to delay the desired EQR signal based on one of a rotational velocity of a crankshaft, an air pressure in an intake manifold, and a temperature of engine coolant, wherein the delay module delays the desired EQR signal for the determined number of engine events.

3. The fuel control system of claim 1 further comprising a discrete integrator module that determines a first correction factor based on an EGO signal received from the EGO sensor, an expected EGO signal generated based on the desired EQR, an engine revolutions per minute (RPM), and an engine manifold air pressure (MAP), wherein the control module determines a new fuel command based on the first correction factor.

4. The fuel control system of claim 3 wherein the discrete integrator module determines a gain of the first correction factor based on the engine RPM, the engine MAP, predetermined knot values of a spline of the engine RPM, and predetermined knot values of a spline of the engine MAP.

5. The fuel control system of claim 1 further comprising a lead-lag compensator module that determines a second correction factor based on an EGO signal received from the EGO sensor, an expected EGO signal generated based on the desired EQR, an engine RPM, and an engine MAP, wherein the control module determines a new fuel command based on the second correction factor.

6. The fuel control system of claim 5 wherein the lead-lag compensator module determines gains of the second correction factor based on the engine RPM, the engine MAP, predetermined knot values of a spline of the engine RPM, and predetermined knot values of a spline of the engine MAP.

7. A method for controlling fuel supply to an engine, comprising:

generating a desired equivalence ratio (EQR) signal based on a dither signal and a desired EQR of an exhaust gas;

determining an offset indicating a change in the desired EQR signal;

generating an expected EQR signal based on a model that relates the expected EQR signal to a sum of the desired EQR signal and the offset and that adjusts a fuel command based on the expected EQR signal; and generating the expected EQR signal independently of a feedback from an exhaust gas oxygen (EGO) sensor.

8. The method of claim 7 further comprising:

determining a number of engine events to delay the desired EQR signal based on one of a rotational velocity of a crankshaft, an air pressure in an intake manifold, and a temperature of engine coolant; and delaying the desired EQR signal for the determined number of engine events.

9. The method of claim 7 further comprising:

determining a first correction factor based on an EGO signal received from the EGO sensor, an expected EGO signal generated based on the desired EQR, an engine revolutions per minute (RPM), and an engine manifold air pressure (MAP); and determining a new fuel command based on the first correction factor.

10. The method of claim 9 further comprising determining a gain of the first correction factor based on the engine RPM, the engine MAP, predetermined knot values of a spline of the engine RPM, and predetermined knot values of a spline of the engine MAP.

11. The method of claim 7 further comprising:

determining a second correction factor based on an EGO signal received from the EGO sensor, an expected EGO signal generated based on the desired EQR, an engine RPM, and an engine MAP; and determining a new fuel command based on the second correction factor.

12. The method of claim 11 further comprising determining gains of the second correction factor based on the engine RPM, the engine MAP, predetermined knot values of a spline of the engine RPM, and predetermined knot values of a spline of the engine MAP.

13. The fuel control system of claim 1 wherein the control module applies the dither signal to the desired EQR signal, wherein the dither signal causes the desired EQR signal to oscillate about the desired EQR of the exhaust gas through open-loop control of the model.

14. The method of claim 7 further comprising applying the dither signal to the desired EQR signal, wherein the dither signal causes the desired EQR signal to oscillate about the desired EQR of the exhaust gas through open-loop control of the model.

15. The fuel control system of claim 1 wherein the model is of a pre-catalyst exhaust gas oxygen (EGO) sensor.

16. A fuel control system of an engine, comprising:

a setpoint generator module that generates a desired equivalence ratio (EQR) signal based on a dither signal and a desired EQR of an exhaust gas;

an offset module that generates an offset indicating a change in the desired EQR signal; and a control module that generates an expected EQR signal based on a model that relates the expected EQR signal to a sum of the desired EQR signal and the offset and that adjusts a fuel command to meet the expected EQR signal, wherein the control module generates the expected EQR signal using an open-loop control based on the model instead of using a closed-loop control based on calibration.

17. The fuel control system of claim 1 further comprising:

a fuel determination module that generates a desired fuel command based on the desired EQR signal and a mass airflow signal;

a fuel EGO determination module that generates an expected EGO signal based on the desired EQR signal; and a closed-loop fuel control module that receives a feedback signal from an EGO sensor, that generates a correction factor to correct an error between the expected EGO signal and the feedback signal, and that generates a new fuel command based on the correction factor and the desired fuel command.

18. The method of claim 7 wherein the model is of a pre-catalyst EGO sensor.

19. A method for controlling fuel supply to an engine, comprising:

generating a desired equivalence ratio (EQR) signal based on a dither signal and a desired EQR of an exhaust gas;

determining an offset indicating a change in the desired EQR signal;

generating an expected EQR signal based on a model that relates the expected EQR signal to a sum of the desired EQR signal and the offset and that adjusts a fuel command based on the expected EQR signal; and generating the expected EQR signal using an open-loop control based on the model instead of using a closed-loop control based on calibration.

20. The method of claim 12 further comprising:

generating a desired fuel command based on the desired EQR signal and a mass airflow signal;

generating an expected EGO signal based on the desired EQR signal;

receiving a feedback signal from an EGO sensor;

generating a correction factor to correct an error between the expected EGO signal and the feedback signal; and generating a new fuel command based on the correction factor and the desired fuel command.

* * * * *